United States Patent [19]

Middleton

[11] 4,348,812
[45] Sep. 14, 1982

[54] GUN BARREL INTERNAL DIAMETER INDICATOR

[76] Inventor: Forest L. Middleton, 611 Bowens Mill Rd., Middleville, Mich. 49333

[21] Appl. No.: 229,332

[22] Filed: Jan. 29, 1981

[51] Int. Cl.³ ............................................. G01B 5/12
[52] U.S. Cl. .............................. 33/147 K; 33/178 R; 33/162
[58] Field of Search .......... 33/178 R, 178 F, 147 K, 33/162, 156 B, 148 R, 164, 143 E

[56] References Cited

U.S. PATENT DOCUMENTS

| | | | |
|---|---|---|---|
| 890,590 | 6/1908 | Anderson | 33/178 R |
| 2,047,607 | 7/1936 | Zimmerman | 33/178 R |
| 2,642,672 | 6/1953 | Lewis et al. | 33/178 R |
| 2,663,942 | 12/1953 | Rudolph | 33/178 R |
| 2,679,690 | 6/1954 | Chorlton | 33/178 R |
| 2,829,440 | 8/1958 | Pedrick | 33/178 R |
| 3,352,021 | 11/1967 | Leach et al. | 33/178 R |
| 3,589,017 | 6/1971 | Kyle | 33/178 R |

FOREIGN PATENT DOCUMENTS

| | | | |
|---|---|---|---|
| 992336 | 10/1951 | France | 33/178 R |
| 2535 | of 1875 | United Kingdom | 33/178 R |
| 463361 | 3/1937 | United Kingdom | 33/178 R |
| 596501 | 1/1945 | United Kingdom | 33/178 R |
| 1224154 | 3/1971 | United Kingdom | 33/178 R |

OTHER PUBLICATIONS

Abstract of Ser. No. 155,317 entitled Circular Size Gauge for Tubular Objects, Applicant Gerald A. Gustafson.

*Primary Examiner*—Harry N. Haroian
*Attorney, Agent, or Firm*—Price, Heneveld, Huizenga & Cooper

[57] ABSTRACT

A gun barrel internal diameter indicator for checking a barrel bore includes an elongated, narrow holder defining a passage within which an elongated, flat bar is disposed. The bar includes a forward, inwardly tapered portion having lateral edges. A pair of blades are pivoted to the holder and include cam followers riding on the lateral edges of the tapered portion of the bar. Axial shifting of the bar spreads the blades apart. Suitable indicia on the bar provide a direct indication of the barrel internal diameter.

17 Claims, 6 Drawing Figures

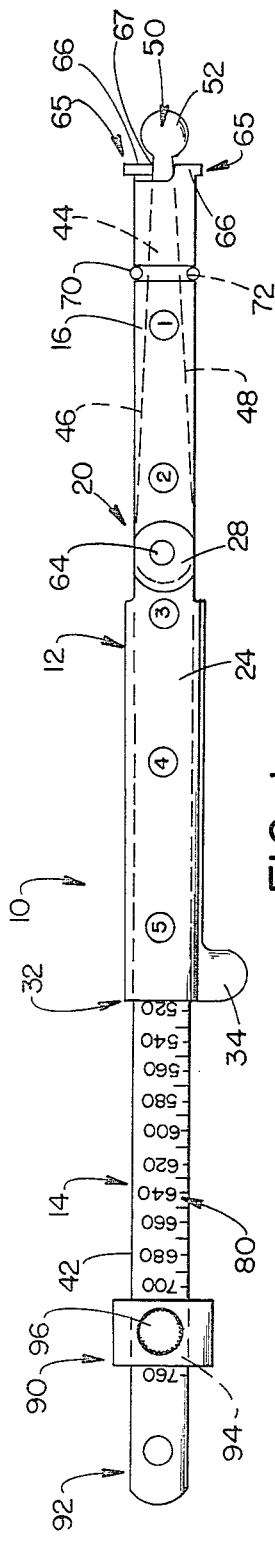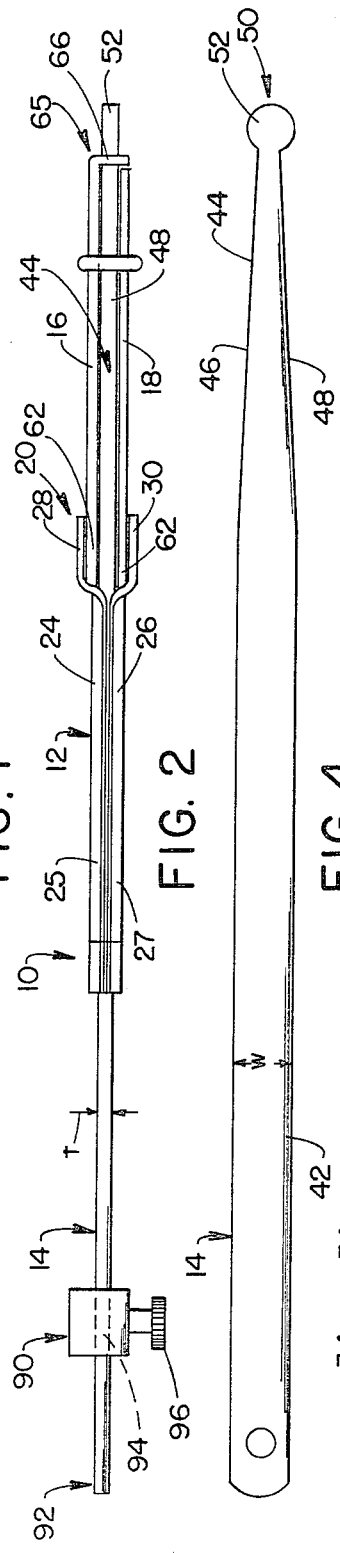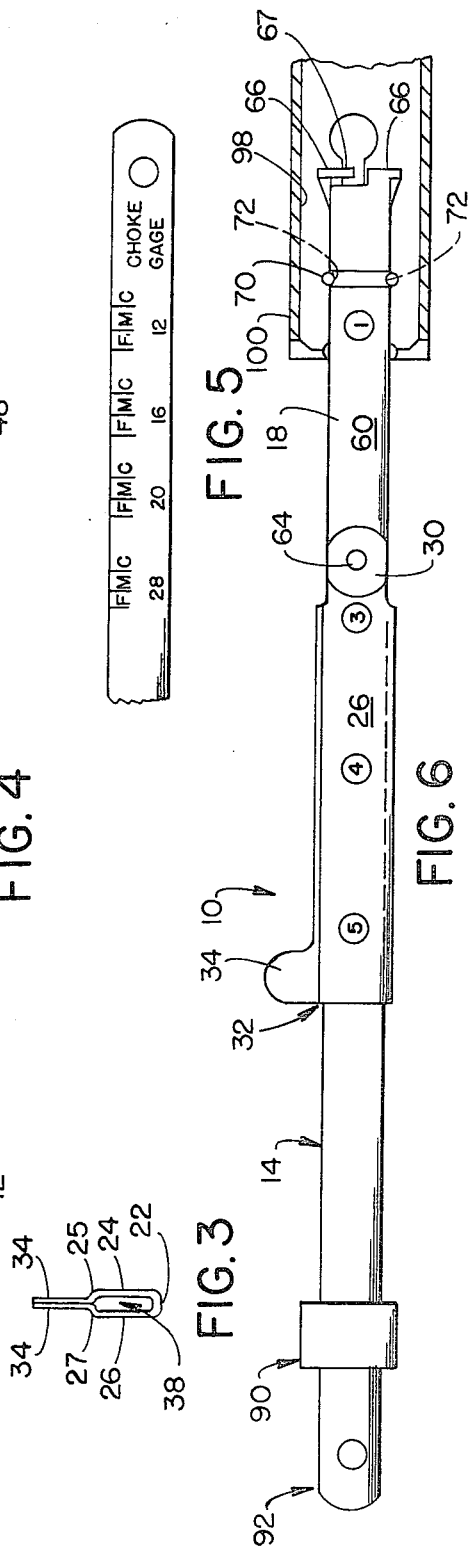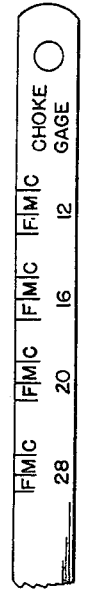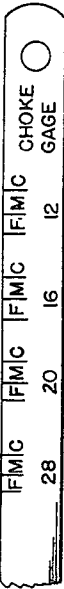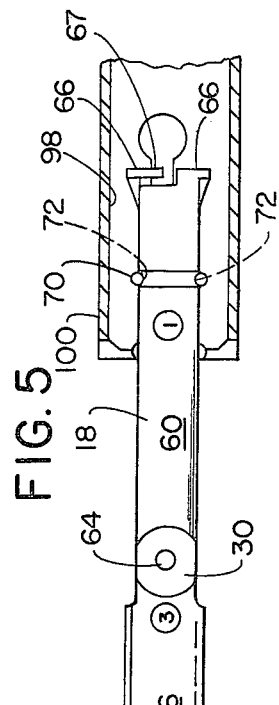

GUN BARREL INTERNAL DIAMETER INDICATOR

BACKGROUND OF THE INVENTION

The present invention relates to an indicator or gauge for measuring and checking the internal diameter of a gun barrel.

Shotgun barrels are provided in various sizes. The sizes are generally indicated by gauge numbers. As the gauge number increases, the internal bore diameter of the barrel decreases. For example, a standard 10-gauge shotgun has an internal bore diameter of 0.775 inches, and a standard 12-gauge shotgun has an internal diameter bore of 0.729 inches. While the gauge numbers are supposed to correspond to standard internal diameters, the actual internal diameter may be less or more than the "standard" diameter. For example, the actual internal diameter of a 12-gauge bore produced by different manufacturers may vary from as little as 0.722 inches to as large as 0.747 inches.

Shotgun barrels at the muzzle end are also "choked" to control the shot pattern. The muzzle end of the barrel is constricted by the various choke designs in order to provide a desired pattern. A full choke is supposed to deliver 70-80% of the shot to a 30-inch circle at 40 yards. A modified, or half choke, is supposed to deliver approximately 55-65% of the shot to the 30-inch circle at 40 yards. An improved cylinder choke is supposed to deliver between 45-55% of the shot to the 30-inch circle at 40 yards. For a standard gauge barrel, a specific internal diameter at the constriction is supposed to provide the desired "choked" pattern. The "standard" constrictions are not always used by the manufacturer. For example, a barrel marked "full" choke, may have a constricted diameter which corresponds to or approximates a modified choke constriction.

Also, various forms of variable choke devices are presently available. Since the actual internal diameter of the various gauge shotgun barrels produced by different manufacturers may vary from the standards, different results can be achieved when the same variable choke device is used on different shotguns. When the choke device is used on a particular gun at one setting, a different degree or amount of constriction is obtained if it is used at the same setting on a different barrel of the same marked gauge.

It is, therefore, desirable for the shotgun user to be able to check or measure the internal diameter of the barrel at various depths and also to be able to check the degree of constriction or choke at the muzzle end of the barrel. The actual internal diameter of the barrels can also provide an indication to the user of the degree of useful life or the amount of wear which has been experienced through use. As shotguns are used, internal barrel wear is necessarily experienced. The degree of constriction at the muzzle end or "choke" may decrease also during use.

Heretofore, various devices have been proposed for permitting the gunsmith and/or user to check and measure the internal diameter of the barrel. One such instrument includes an elongated, cylindrical tube or body which supports a gauge head having a plurality of resilient arms extending therefrom. A tapered, generally conically shaped rod is slidably received within the elongated tube. As the rod is shifted in the tube, the resilient arms are flexed into radial engagement with the bore of the gun barrel. The extent of axial translation of the rod is directly proportional to the internal diameter of the barrel.

Other gauges which have heretofore been proposed for measuring the internal diameter of a gun barrel also include a relatively simple X-shaped scissors mechanism which may be inserted into the gun barrel. Once inserted, the scissors mechanism is expanded about its pivot point. After expansion, the mechanism is withdrawn and the degree of expansion measured by a standard micrometer. This device may be difficult to use when measuring the barrel from the muzzle end due to the choke constriction. Another device is a relatively complex, cylindrically-shaped unit which has a conically-shaped end for biasing retained ball bearings outwardly against the internal diameter or inner surface of the barrel. A graduated gauge at the outer end of the structure is provided for directly reading the internal diameter.

Various forms of general purpose gauging or indicator tools have been proposed for indicating internal diameter. One such gauge or tool is disclosed in U.S. Pat. No. 2,642,672, entitled Hole Gauge and issued on June 23, 1953, to Lewis et al. This tool includes an elongated, conical plug attached to one end of a rod which is slidably disposed in a generally cylindrical body. A plurality of balls are held in engagement with the conical plug by resilient arms which in turn are secured to the body. As the rod is shifted axially, the balls ride on the conical plug and are shifted radially outwardly. This gauge or tool is specifically designed for measuring the internal diameter of holes formed in the roof of a mine to receive expansion bolts. Other examples of general use internal diameter gauges may be found in U.S. Pat. No. 2,663,942, entitled Instrument for Measuring Inside Dimensions and issued on Dec. 29, 1953, to Rudolph and U.S. Pat. No. 3,589,017, entitled Bore Gauge and issued on June 29, 1971, to Kyle.

A need exists for a relatively inexpensive device which is as accurate as the complex cylindrical devices of the prior art yet which requires no additional micrometer or the like to make the measurement. Such a device would preferably possess the advantages of increased ease of manufacture, increased ease of assembly and ease of use when compared to the prior art structures. Such a device would permit a greater number of shotgun users to accurately check the internal diameter of a gun barrel and to accurately determine the degree of choke provided by the manufacturer.

SUMMARY OF THE INVENTION

In accordance with the present invention, a unique gun barrel internal diameter indicator or bore gauge for checking the internal diameter of a gun barrel and/or for checking the degree of choke is provided and by which the aforementioned needs are achieved. Essentially, the device includes an elongated, one-piece body which defines a generally rectangular through passage or slot. An elongated, flat bar is disposed within the body for axial or longitudinal movement through the slot or passage. The flat bar includes a forward portion with inwardly tapered lateral edges. A pair of flat arms or blades are pivotally secured to the body and include forward ends which ride on the tapered lateral edges of the bar. Provision is made for biasing the arms into engagement with the bar.

The body and arms may include indicia to indicate the degree or depth of insertion of the instrument into a gun barrel. The bar is also preferably marked with suitable indicia to indicate the diameter which is directly proportional to the degree of expansion of the arms as the rod is shifted axially in the body. The bar may include suitable indicia to indicate internal diameter corresponding to full choke, modified choke and improved cylindrical choke for various shotgun gauges, such as 12-gauge, 16-gauge, 20-gauge and 28-gauge.

The body is preferably formed from a single piece of sheet material which may be stamped and bent to define a narrow base and opposed generally parallel side-walls. Similarly, the bar and the arms may be stamped from sheet material as generally flat members. As a result, the tool includes essentially four pieces which are relatively easily and inexpensively manufactured. The pieces are readily assembled and the instrument is easy to use and obtains precise and exact internal diameter measurements.

In further aspects of the invention, a stop or lock member may be positioned at the outer end of the bar. When the tool is used to determine the internal diameter of a barrel, the stop may be moved up against the back of the body and secured in position. The instrument may then be removed from the barrel and "reset" so that the extent of expansion of the arms and hence the internal diameter of the barrel may be more accurately measured through the use of a micrometer. Also, the manufacturer may provide a plurality of differently tapered bars so that the full range of barrels may be checked.

BRIEF DESCRIPTION OF THE DRAWINGS

FIG. 1 is a right, side elevational view of a gun barrel internal diameter indicator in accordance with the present invention;

FIG. 2 is a top, plan view thereof;

FIG. 3 is a rear, elevational view of the body or holder portion of the invention;

FIG. 4 is a side elevational view of the elongated tapered bar incorporated in the present invention;

FIG. 5 is a fragmentary, elevational view of a portion of the bar showing the indicia included to indicate the degree of choke for various gauge shotguns; and FIG. 6 is a left, side elevational view of the indicator shown partially inserted into the muzzle end of a shotgun barrel.

DETAILED DESCRIPTION OF THE PREFERRED EMBODIMENT

The preferred embodiment of the indicator or bore gauge in accordance with the present invention is illustrated in FIGS. 1, 2 and 6 and generally designated 10. Indicator 10 includes a body or holder 12, an elongated slide bar or flat rod 14 slidably disposed within the holder 12 and a pair of opposed blades or arms 16, 18 which are pivoted to a forward end 20 of holder 12.

As best seen in FIGS. 1, 2 and 3, body or holder 12 is an elongated member and includes a narrow longitudinally extending base 22, generally parallel, spaced and opposed sidewalls 24, 26, inturned upper lateral edges 25, 27, and a pair of forwardly located pivot ears or tabs 28, 30. Each sidewall 24, 26 further includes a tab 34 at a rear end 32 of the holder. Tabs 34 define a stop to limit insertion of the gauge into the gun barrel and also provide a convenient grasp for holding the device. Holder 12, therefore, is a generally elongated, rectanglar member which is very narrow in transverse dimension and which defines an axially extending through passage or slot 38 of generally rectangular configuration. Slide bar 14 is slidably disposed for axial movement within slot 38. Bar 14 is dimensioned to be received by and guided by the holder 12.

As seen in FIGS. 2 and 4, slide bar 14 is an elongated, flat member which has a transverse dimension w greater than its thickness t. Bar 14 includes an elongated, first or indicator portion 42 of generally constant transverse width dimension and a forward, inwardly tapered portion 44. Lateral edges 46, 48 of the bar taper inwardly to an apex point generally designated 50. The tapered portion 44 of the bar terminates in a generally cylindrical stop member 52 disposed at the apex 50. Bar 14 is symmetrical about its longitudinal axis.

Each arm 16, 18 is a blade-like structure including an elongated, flat first portion 60. First portion 60 includes an end 62 which is pivoted to a respective pivot ear or tab 28, 30 by a pin 64. The blades are, therefore, pivotable in parallel planes on each side of bar 14. The forward or front ends 65 of each blade 16, 18 are defined by inwardly bent portions or tabs 66. As should be clear from FIGS. 1, 2 and 6, tabs 66 are in effect cam followers and each defines a notch 67 to receive and to ride on a lateral edge 48 or 46. The tapered portion of the rod or bar in effect defines a cam which will spread the blades or arms apart as the bar is shifted axially with respect to the body or holder 12.

As seen in FIGS. 1 and 2, a resilient means illustrated as a rubber O-ring 70 extends around both blades 16, 18. The blades are formed with suitable notches 72 to hold the O-ring in a fixed position. The O-ring, therefore, biases the forward ends 65 and the cam followers 66 into engagement with the lateral edges 46, 48 of the tapered portion of the bar 14.

In a presently existing embodiment of the gauge or indicator in accordance with the present invention, the body 12 is stamped and bent from 0.030 inch sheet stock metal material. The body has an overall length from the center of pivot pin 64 to end 32 of 3 inches. The height of the body or transverse dimension of sidewalls 26, 24 is approximately 0.480 inches. The bar 14 is fabricated from 0.075 by 0.375 inch stock sheet metal. The tapered portion has a working length of approximately 2.40 inches and the lateral edges taper inwardly from a maximum transverse width of 0.360 inches to a minimum transverse width of 0.120 inches at the apex or just forward of the cylindrical stop 52. The length of the generally constant transverse dimension or width portion of bar 14 is approximately 8.70 inches. Each arm or blade 16, 18 has an overall length of approximately 2.7 inches and a transverse dimension or width of approximately 0.4 inches.

The front or forward end portions 65 of the blades and the taper of the bar are dimensioned so that the initial distance between the top edges of the blades are their forward ends is approximately 0.520 inches. When the rod is shifted forward through the working area of the tapered portion, the arms will spread or expand radially outwardly to a maximum dimension of approximately 0.760 inches. The parts are dimensioned so that each shift of the rod with respect to the holder of 0.10 inches is equal to an increase in the diameter defined by the arms of 0.010 inches. As seen in FIG. 1, bar 14 is calibrated with suitable indica 80 from 0.520 to 0.760 inches. Complete rearward withdrawal of blade 14 from holder 12 is prevented by the forward stop 52 of blade 14 which engages the front end 65 of the blades or arms.

One side of the bar 14, as illustrated in FIG. 5, is also provided with suitable indicia to indicte the choke of particular gauge shotguns. As illustrated, positioning of the bar 14 or the measured internal dimeter for a full, modified and improved cylindrical choke for 12, 16, 20 and 28-gauge shotguns is indicated. For the 12-gauge position, the full choke or F mark is equivalent to a diameter of 0.694 inches, the modified or M mark is equivalent to a diameter of 0.710 inches and the improved cylindrical or C mark is equivalent to a diameter of 0.729 inches. For a 16-gauge shotgun, the F mark is equivalent to a diameter of 0.639 inches, the M mark is equivalent to a diameter of 0.652 inches and the C mark is equivalent to a diameter of 0.667 inches. For a 20-gauge shotgun, the F mark is equivalent to a diameter of 0.592 inches, the M mark is equivalent to a diameter of 0.603 inches and the C mark is equivalent to a diameter of 0.617 inches. For a 28-gauge shotgun, the F mark is equivalent to a diameter of 0.528 inches, the M mark is equivalent to a diameter of 0..538 inches and the C mark is equivalent to a diameter of 0.550 inches.

Also, as illustrated in FIGS. 1, 2 and 6, it is presently preferred that a lock or set point member 90 be slidably and adjustably disposed on rod 14 between the rear end 92 of the rod and the body or holder 12. Lock member 90 is a generally rectangular block having a through bore or slot 94 formed therein and through which bar 14 extends. A set screw 96 is threadably disposed in one side of member 90. Set screw 96 will lock block 90 in any position on the bar 14.

OPERATION

As schematically illustrated in FIG. 6, tool 10 is inserted into the barrel of a shotgun. The depth of insertion is indicated by indicia imprinted on the body, as illustrated in FIGS. 1 and 6. The markings illustrated show the depths of insertion of one, two, three, four and five inches. When positioned at the desired depth within the barrel, rod 14 is slid forwardly so that the blades or arms 16, 48 will expand outwardly as their forward ends 65 ride on the tapered lateral edges of the bar. Bar 14 is shifted axially until the arms come into engagement with the inner peripheral surface 98 of the shotgun barrel, which is schematically shown and designated 100. The user can then read the internal diameter directly from bar 14 since the indicia 80 indicating such will be at the rear end 32 of holder 12.

When so positioned, the lock or set point member 90 may be loosened on bar 14 and moved up to engage the rear end 32 of holder 12 and then locked to the bar. The user may then withdraw the tool from the barrel by first shifting the bar 14 to move the arms or blades back towards each other so that any choke restriction can be cleared. Once removed from the barrel, the user can "reset" the indicator by shifting the bar 14 axially until member 90 engages the rear end 32 of holder 12. The internal diameter may again be measured with a micrometer. The micrometer will measure the distance between the outer surfaces of the blades or arms at their forward ends.

When used to measure the degree of choke or constriction of the muzzle end of the barrel, the user need merely refer to the choke gauge portion or indicia imprinted on the opposite side of blade 14 and which is indicated in FIG. 5. The specific diameter at the constricted portion of the barrel will be indicated to the user. The choke gauge indicates to the user that the constriction lies somewhere within the range of a full choke to an improved cylindrical choke. This information can be extremely valuable to the user when the desired shot pattern or expected accuracy with the particular shotgun is not being achieved. Also, it permits the user to obtain a ready reference between the various standards employed by the different manufacturers for indicating a full, modified and improved cylindrical choke on the shotgun barrel.

As should be readily apparent, the internal diameter gauge or indicator is relatively easily and inexpensively manufactured from simple stamped parts. The device is extremely easy to use and represents a significant advance over the rather complex, relatively bulky and expensive cylindrical devices which have heretofore been available. The gauge permits a direct readout of internal diameter and eliminates the need for a separate micrometer. As discussed above, however, if a more precision reading is desired, the lock or set point member permits the device to be reset after it is withdrawn from a shotgun barrel to permit measurement with a micrometer.

In view of the foregoing description, those of ordinary skill in the art will undoubtedly envision various modifications to the present invention which will not depart from the inventive concepts disclosed herein. For example, the precise configuration of the arms could be modified somewhat from that illustrated while still providing pivoted members which will ride outwardly or expand on the tapered portion of the bar. The configuration of the body could also be changed while still achieving the desired narrow dimensions and ease of manufacture. It is expressly intended, therefore, that the above description should be considered as that of the preferred embodiment. The true scope and spirit of the present invention may be determined by reference to the appended claims.

The embodiments of the invention in which an exclusive property or privilege is claimed are defined as follows:

1. A bore gauge for checking the internal diameter of a gun barrel, said gauge comprising:
    an elongated, one-piece body defining a generally rectangular through passage and a pair of transversely spaced pivot ears on one end;
    an elongated, flat bar slidably disposed within said body, said bar including an indicator portion and a tapered portion having converging lateral edges; and
    a pair of flat arms, each arm including an end pivoted to one of said pivot ears, each arm further including a cam follower riding on one of said lateral edges of said tapered portion of said bar whereby said body may be inserted into a gun barrel and said bar may be slid through said body causing said arms to pivot and spread apart into contact with the inner diameter of said barrel and the internal diameter of the barrel may be read on the indicator portion of the bar.

2. A bore gauge as defined by claim 1 further including:
    a set point member slidably movable on said indicator portion of said bar; and
    lock means on said set point member for locking said set point member to said indicator portion of said bar.

3. A bore gauge as defined by claim 1 wherein said one-piece body is stamped from flat sheet material and bent to define a narrow base and a pair of opposed, longitudinally extending, parallel sides, said bore and said sides defining said through passage.

4. A bore gauge as defined by claim 1 further including:
resilient means engaging said arms for resiliently biasing said cam followers into engagement with the lateral edges of said bar.

5. A bore gauge as defined by claim 1 wherein said tapered portion of said bar terminates in an apex, said bar defining an arm stop at said apex, said stop dimensioned to engage said cam followers to prevent complete withdrawal of said bar from said body.

6. A bore gauge as defined by claim 4 wherein said one-piece body is stamped from flat sheet material and bent to define a narrow base and a pair of opposed, longitudinally extending, parallel sides, said bore and said sides defining said through passage.

7. A bore gauge as defined by claim 6 further including:
a set point member slidably movable on said indicator portion of sid bar; and
lock means on said set point member for locking said set point member to said indicator portion of said bar.

8. A bore gauge as defined by claim 7 wherein said tapered portion of said bar terminates in an apex, said bar defining an arm stop at said apex, said stop dimensioned to engage said cam followers to prevent complete withdrawal of said bar from said body.

9. A bore gauge as defined by claim 8 wherein said tapered portion of said bar is dimensioned so that said arms spread outwardly 0.010 inches for each 0.100 inch of longitudinal movement of said bar through said body.

10. A bore gauge as defined by claim 9 wherein a side of said bar along said indicator portion includes diameter indicia and the other side includes choke gauge indicia.

11. A gun barrel and choke internal diameter indicator, comprising:
an elongated, generally rectangular holder having a rear end, a front end, and a through slot opening through said ends, said holder further including an elongated narrow base and a pair of opposed sidewalls which define said slot;
an elongated slide bar axially shiftable within said slot, said bar having opposed lateral edges and a width greater than its thickness, said bar further including an inwardly tapered forward portion extending out of said front end of said holder;
a first elongated, flat blade having a rear end pivoted to one of said sidewalls and a forward end engaging one of said lateral edges of said bar along said tapered portion;
a second elongated, flat blade having a rear end pivoted to the other end of said sidewalls of said holder and a forward end engaging the other of said lateral edges of said bar along said tapered portion; and
biasing means engaging said blades for biasing said forward ends of said blades into engagement with said lateral edges of said bar so that as said bar is shifted axially of said holder, said blades will spread apart as said forward ends thereof ride up said tapered portion.

12. A gun barrel and choke internal diameter indicator as defined by claim 11 wherein said holder is stamped from sheet metal and bent to define said through slot.

13. A gun barrel and choke internal diameter indicator as defined by claim 11 wherein said holder further includes opposed, integral pivot tabs at said front end and said blades are pivoted to said pivot tabs.

14. A gun barrel and choke internal diameter indicator as defined by claim 13 wherein each of said blades in plan view includes an elongated portion and a short tab portion extending perpendicular to said elongated portion, said tab portion defining said forward end of said blade and further having a notch receiving a lateral edge of said bar.

15. A gun barrel and choke internal diameter indicator as defined by claim 14 wherein said tapered portion of said bar terminates in an enlarged stop.

16. A gun barrel and choke internal diameter indicator as defined by claim 13 further including:
a block defining a passage through which said bar extends; and
a set member carried by said block for locking said block on said bar, said bar including indicia indicating the expansion of said arms due to movement of said bar whereby said indicator may be inserted into a barrel, the bar may be slid forward until said blades engage the inner surface of the barrel, the block may be locked at the indicia indicating internal diameter, said indicator may be removed and said bar reset and the positioning of the arms may be measured by a micrometer.

17. A gun barrel and choke internal diameter indicator as defined by claim 16 wherein said holder includes indicia indicating the depth of insertion of the indicator into the gun barrel.

* * * * *